(12) United States Patent
Chase-Salerno et al.

(10) Patent No.: US 7,870,998 B2
(45) Date of Patent: *Jan. 18, 2011

(54) PRIVATE INFORMATION EXCHANGE IN SMART CARD COMMERCE

(75) Inventors: Michael S. Chase-Salerno, New Paltz, NY (US); Sean Dague, Poughkeepsie, NY (US); Richard Ferri, Ulster Park, NY (US); Michael H. Grundy, Montgomery, NY (US)

(73) Assignee: International Business Machines Corporation, Armonk, NY (US)

( * ) Notice: Subject to any disclaimer, the term of this patent is extended or adjusted under 35 U.S.C. 154(b) by 298 days.

This patent is subject to a terminal disclaimer.

(21) Appl. No.: 12/129,844

(22) Filed: May 30, 2008

(65) Prior Publication Data
US 2008/0229108 A1    Sep. 18, 2008

Related U.S. Application Data

(63) Continuation of application No. 11/416,953, filed on May 3, 2006, now Pat. No. 7,516,884.

(51) Int. Cl.
*G06K 5/00*    (2006.01)
(52) U.S. Cl. .................. 235/380; 235/492; 235/382.5; 235/487; 713/185
(58) Field of Classification Search ................. 235/380, 235/492, 382, 382.5, 487, 451; 713/185–186
See application file for complete search history.

(56) References Cited

U.S. PATENT DOCUMENTS

| 7,128,273 | B2 * | 10/2006 | Kelley et al. ................. 235/492 |
| 2007/0019845 | A1 * | 1/2007 | Kato ........................... 382/126 |

\* cited by examiner

*Primary Examiner*—Edwyn Labaze
(74) *Attorney, Agent, or Firm*—Dillon & Yudell LLP

(57) ABSTRACT

A method, system and computer program product for private information exchange in smart card commerce is disclosed. The method includes, in response to determining that an item of biometric data received on a biometric reader corresponds to an authorized user, unlocking a communication channel on a communication port, exchanging public keys between the user and authorized point of sale, receiving an information request from an external point of sale machine across the communication channel, decrypting an information request and parsing a data token. In response to determining that private data has been requested in the information request, a user is prompted for authorization to release the private information, and private information exchange in smart card commerce is performed by, in response to the user pressing a yes button on the smart card, placing an encrypted copy of the private data in the public area of the smart card for transmission across the communication channel to the external point of sale machine.

19 Claims, 2 Drawing Sheets

PRIVATE INFORMATION EXCHANGE IN SMART CARD COMMERCE

CROSS-REFERENCE TO RELATED APPLICATIONS

The present application is a continuation of U.S. patent application Ser. No. 11/416,953 filed on May 3, 2006, entitled "Method and System for Private Information Exchange in Smart Card Commerce". Applicants claim benefit of priority under 35 U.S.C. §120 to U.S. patent application Ser. No. 11/416,953, which is incorporated by reference herein in its entirety and for all purposes.

BACKGROUND OF THE INVENTION

1. Technical Field

The present invention relates in general to information exchange and in particular to smart cards. Still more particularly, the present invention relates to a system, method and computer program product for performing private information exchange in smart card commerce.

2. Description of the Related Art

A smart card, chip card, or integrated circuit(s) card (ICC), is defined as any pocket-sized card with embedded integrated circuits. Although there is a diverse range of applications, there are two broad categories of ICCs. Memory cards contain only non-volatile memory storage components, and perhaps some specific security logic. Microprocessor cards contain memory and microprocessor components. Not all chip cards contain a microprocessor (e.g., the memory cards), therefore not all chip cards are necessarily also smart cards. However the public usage of the terminology is often inconsistent. The first mass use of the cards was for payment in French pay phones, starting in 1983 (Télécarte). In 1978, Honeywell Bull patented the SPOM (Self Programmable One-chip Microcomputer) that defines the necessary architecture to auto-program the chip. Three years later, the very first "CP8" based on this patent was produced on by Motorola.

The second use of smartcards was with the integration of a microchips into all French debit cards (Carte Bleue) completed in 1992. When paying in France with a Carte Bleue, one inserts the card into the merchant's terminal, then types the PIN, before the transaction is accepted. Only very limited transactions (such as paying small autoroute tolls) are accepted without PIN. Smart-card-based electronic purse systems (in which value is stored on the card chip, not in an externally recorded account) were tried throughout Europe from the mid-1990s, most notably in Germany (Geldkarte), Belgium (Proton), the Netherlands (Chipknip and Chipper), Switzerland ("Cash"), Sweden ("Cash"), UK ("Mondex") and Denmark ("Danmønt"). None of these programs attracted any notable public interest, and usage levels remained low to negligible. The major boom in smart card use came in the 1990s, with the introduction of the smart-card-based SIM used in GSM mobile phone equipment in Europe. They are becoming quite common now. For the banks interested in introducing smart cards the only quantifiable benefit is the ability to forecast a significant reduction in fraud, in particular counterfeit, lost and stolen. The current level of fraud a country is experiencing determines if there is a business case for the financial institutions.

Smart cards with contactless interfaces are becoming increasingly popular for payment and ticketing applications such as for mass transit. Visa and MasterCard have agreed to an easy-to-implement version currently being deployed (2004-2006) in the USA. Across the globe, contactless fare collection systems are being implemented to drive efficiencies in public transit. The various standards emerging are local in focus and are not compatible. Smart cards are also being introduced in personal identification and entitlement schemes at regional, national, and international levels. Citizen cards, drivers' licenses, and patient card schemes are becoming more prevalent, and contactless smart cards are being integrated into passports to enhance security for international travel. The applications of smart cards include their use as credit or ATM cards, SIMs for mobile phones, authorization cards for pay television, high-security identification and access-control cards, and public transport payment cards.

Smart cards may also be used as electronic wallets. The smart card chip can be loaded with funds which can be spent in parking meters and vending machines or at various merchants. Cryptographic protocols protect the exchange of money between the smart card and the accepting machine. Examples are Proton, GeldKarte, Moneo and Quick. A quickly growing application is in digital identification cards. In this application, the cards are used for authentication of identity. The most common example is in conjunction with a Public Key Infrastructure (PKI). The smart card will store an encrypted digital certificate issued from the PKI along with any other relevant or needed information about the card holder. Examples include the U.S. Department of Defense (DoD) Common Access Card (CAC), and the use of various smart cards by many governments as identification cards for their citizens. When combined with biometrics, smart cards can provide two- or three-factor authentication. Smart cards are a privacy-enhancing technology, and when used in conjunction with appropriate security and privacy policies, can be part of a highly effective authentication system.

Smart cards have been advertised as suitable for these tasks, because they are engineered to be tamper-resistant. The embedded chip of a smart card usually implements some cryptographic algorithm.

Public key cryptography is a form of cryptography which generally allows users to communicate securely without having prior access to a shared secret key. This is done by using a pair of cryptographic keys, designated as public key and private key, which are related mathematically. The term asymmetric key cryptography is a synonym for public key cryptography in most cases. However, there are asymmetric key encryption algorithms which do not have the public key-private key property noted above. For these algorithms, both keys must be kept secret. In public key cryptography, the private key is generally kept secret, while the public key may be widely distributed. In a sense, one key "locks" a lock; while the other is required to unlock it. It should not be possible to deduce the private key of a pair given the public key.

For most of the history of cryptography, a key had to be kept absolutely secret and would be agreed upon beforehand using a secure, but non-cryptographic, method; for example, a face-to-face meeting or a trusted courier. There are a number of significant practical difficulties in this approach to distributing keys. Public key cryptography was invented to address these drawbacks—with public key cryptography, users can communicate securely over an insecure channel without having to agree upon a shared key beforehand.

Since the 1970s, a large number and variety of encryption, digital signature, key agreement, and other techniques have been developed in the field of public key cryptography. The ElGamal cryptosystem (invented by Taher ElGamal then of Netscape) relies on the (similar, and related) difficulty of the discrete logarithm problem, as does the closely related DSA developed by the NSA and NIST. The introduction of elliptic curve cryptography by Neal Koblitz in the mid '80s has yielded a new family of analogous public key algorithms. Although mathematically more complex, elliptic curves appear to provide a more efficient way to leverage the discrete logarithm problem, particularly with respect to key size.

The most obvious application of a public key encryption system is confidentiality; a message which a sender encrypts using the recipient's public key can only be decrypted by the recipient's paired private key. Public-key digital signature algorithms can be used for sender authentication. For instance, a user can encrypt a message with his own private key and send it. If another user can successfully decrypt it using the corresponding public key, this provides assurance that the first user (and no other) sent it. These characteristics are useful for many other, sometimes surprising, applications, like digital cash, smartcards, password-authenticated key agreement, multi-party key agreement, etc.

Stores are in the business of tracking the buying patterns of their customers. Understanding regional, seasonal and demographic buying patterns is the key to launching successful marketing campaigns and stocking inventory. Because of the importance of being able to track buying patterns by an individual (as distinguished from buying patterns for large groups of people) just about every reasonably sized store offers a "store card". The store card usually carries with it some set of benefits to the consumer, in the form of accumulated points which result in discounts, or direct discounts on every sale. From the vendor perspective, the store card represents a method of tracking each store purchase by an individual consumer, even if the transaction is completed with cash. The incentives offered by the use of the store card increase the likelihood that the consumer will carry and use his or her store card.

The end consumer is, unfortunately, inconvenienced by the proliferation of store cards—he must apply for and carry store cards for all stores that he frequents if he wants to reap the benefits. Much of the information that each store requires is redundant with what other stores require (e.g., Name, Address, Phone Number, etc.), while there may be some unique information (e.g., Mother's Maiden Name, Social Security Number) that the consumer may want to share with just a subset of the authorized stores. Because of the inconvenience of carrying and applying for store cards that the consumer may not frequent often, the consumer may not apply for some fringe store cards and therefore not reap the benefits. Vendors, on the other hand, are motivated to simplify the store card process, which would result in more consumers applying for and using their store cards, which in turn would result in more accurate information on consumer trends.

SUMMARY OF THE INVENTION

A method, system and computer program product for private information exchange in smart card commerce is disclosed. The method includes, in response to determining that an item of biometric data received on a biometric reader corresponds to an authorized user, unlocking a communication channel on a communication port, exchanging public keys between the user and authorized point of sale, receiving an information request from an external point of sale machine across the communication channel, decrypting an information request and parsing a data token. In response to determining that private data has been requested in the information request, a user is prompted for authorization to release the private information, and private information exchange in smart card commerce is performed by, in response to the user pressing a yes button on the smart card, placing an encrypted copy of the private data in the public area of the smart card for transmission across the communication channel to the external point of sale machine.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for performing private information exchange in smart card commerce. The present invention provides a generic store card usable at multiple stores, which distinguishes between generic information that the holder freely distributes and private information that the holder provides more sparingly. The present invention simplifies application for and receipt of benefits, which assists the potential holder and provides utility to the vendor by encouraging more shoppers to apply. The present invention provides strong yet simple security to protect the holder's private information.

Figure 1:
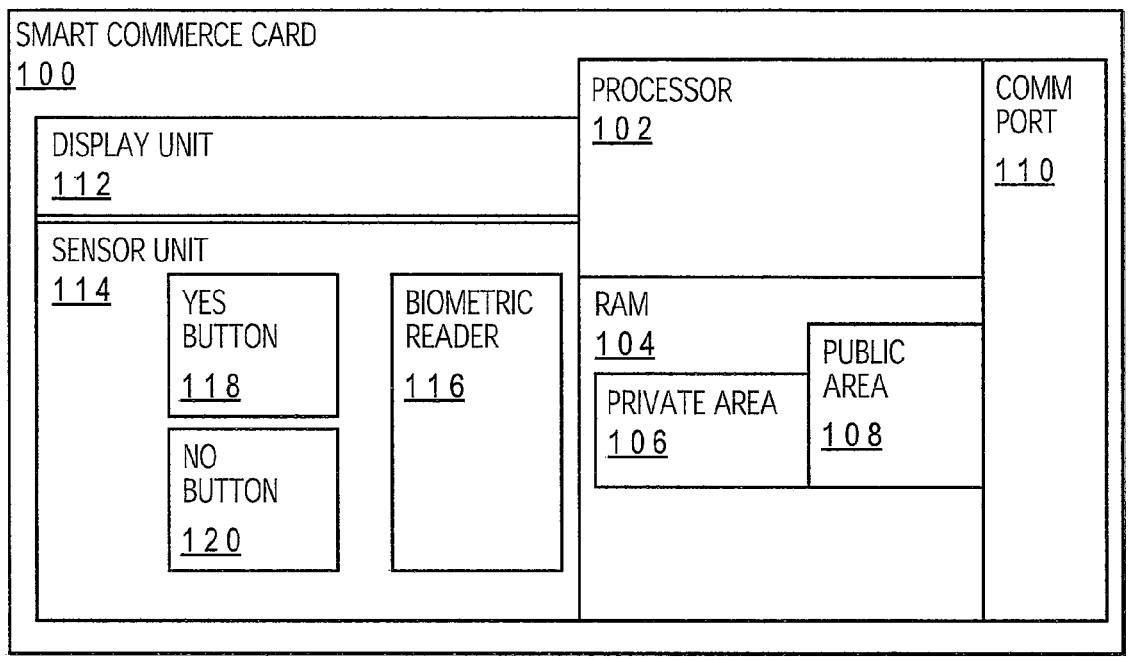
FIG. 1 depicts a block diagram of a smartcard smart card with which the present invention of a method, system and computer program product for performing private information exchange in smart card commerce in accordance with a preferred embodiment of the present invention.

With reference now to the figures, and in particular with reference to FIG. 1, a block diagram of a general-purpose smart card for private information exchange in smart card commerce, in accordance with a preferred embodiment of the present invention, is depicted. Smart commerce card 100 contains a processing storage unit (e.g., RAM 104) and a processor 102. RAM 104 contains a private area 106 for secure data storage and a public area 108 for storage of data to be transmitted over a communications port 110 to an external device, such as a point of sale unit (POS). A display unit 112 provides the ability for processor 102 to communicate with a user through the display of messages. A sensor unit 114 allows for security through the collection of biometric data, using a biometric reader 116 such as a fingerprint sensor. Sensor unit 114 also contains a 'yes' button 118 and a 'no' button 120 for the collection of user input.

Smart commerce card 100 is delivered in a form-factor of credit card dimensions (or smaller) with various tamper-resistant properties (e.g. a secure crypto-logic within processor 102, a secure file system within private area 106, human-readable features on display unit 112) and is capable of providing security services (e.g. confidentiality of information within private area 106). The present invention describes a method for a single smart commerce card 100 to be conveniently used in many stores. Because smart commerce card 100 will contain generic information, which is freely disseminated, and private information, which is more sparingly disseminated, within RAM 104, the present invention includes a method using using public key encryption to protect the card's information, and a biometric reader 116 to protect the physical security of smart commerce card 100 in case of loss.

Figure 2:
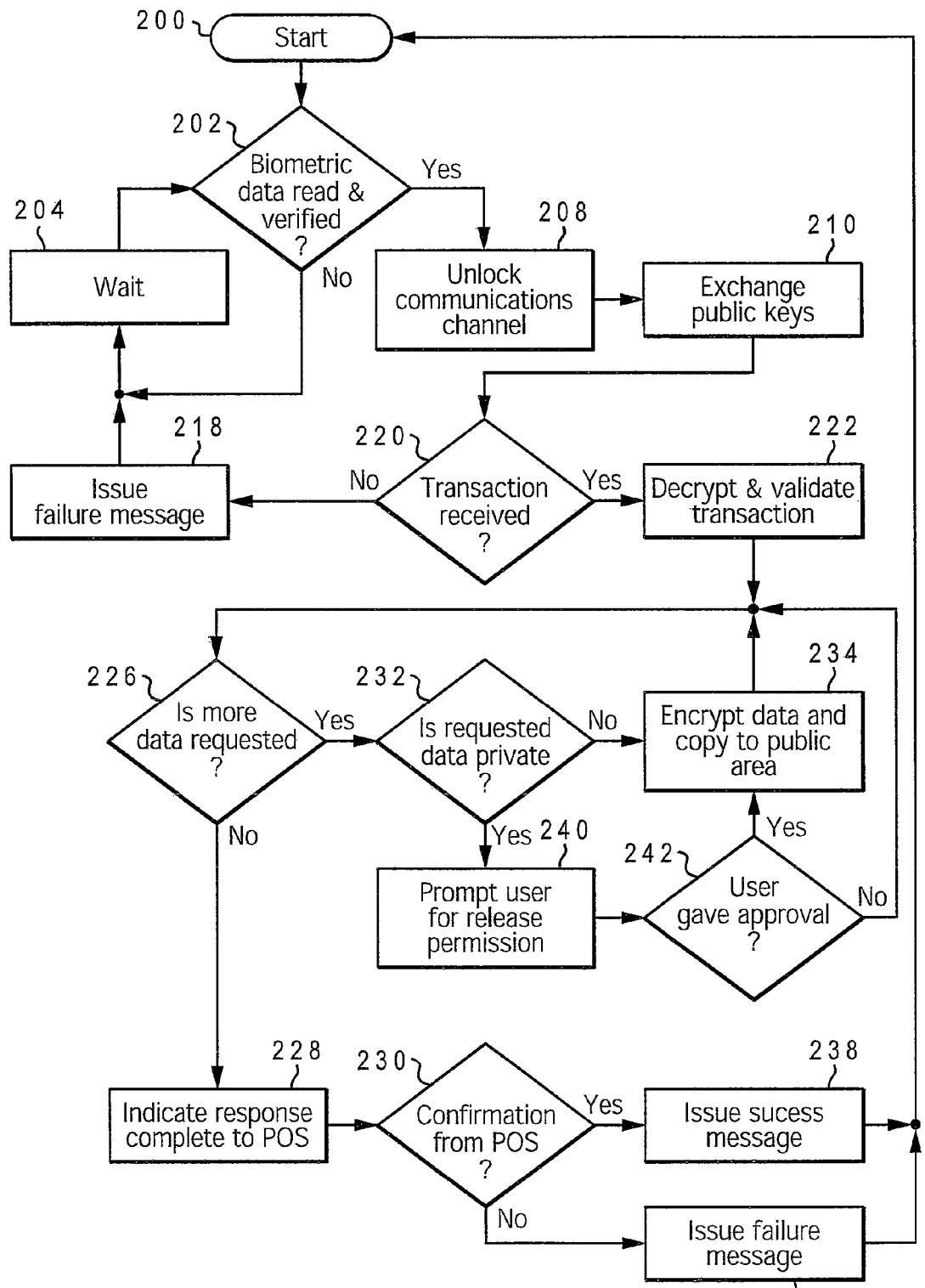
FIG. 2 is a high-level logical flowchart of a process for performing private information exchange in smart card commerce in accordance with a preferred embodiment of the present invention.

Turning now to FIG. 2, a high-level logical flowchart of a process for performing private information exchange in smart card commerce in accordance with a preferred embodiment of the present invention is depicted. The process starts at step 200 and then proceeds to step 202, which depicts processor 102 of smart commerce card 100 determining whether biometric reader 116 has received valid biometric data for an authorized user, such as a fingerprint. If processor 102 of smart commerce card 100 determines that biometric reader 116 has not received valid biometric data, then the process next moves to step 204. Step 204 illustrates smart commerce card 100 waiting a configurable period of time. The process then returns to step 202.

If, at step 202, processor 102 of smart commerce card 100 determines that biometric reader 116 has received valid biometric data for an authorized user, then the process proceeds to step 208. Step 208 illustrates processor 102 of smart commerce card 100 unlocking a communication channel on communication port 110 for communication with a point-of-sale machine (POS). The process then proceeds to step 210, which depicts the user and point-of-sale machine exchanging public keys over communications port 110. The process then proceeds to step 220. Step 220 depicts the point-of-sale machine sending a transaction over the communication channel 110 to the smart commerce card 100. If, at step 220, the processor 102 of smart commerce card 100 determines that the transaction received from the point-of-sale machine is valid, then the process proceeds to step 222. If, however, at step 220, processor 102 of smart commerce card 100 determines that the transaction received from the point-of-sale machine is not valid, then the process proceeds to step 218. Step 218 illustrates smart commerce card 100 issuing an error message on display unit 112, then the process returns to step 204, which is described above.

Moving now to step 222, processor 102 of smart commerce card 100 performs decryption and validation of a request received from the external POS across communication port 110. The process then proceeds to step 226. Step 226 depicts processor 102 of smart commerce card 100 determining whether the received next data token requests data from RAM 104 of smart commerce card 100.

If processor 102 of smart commerce card 100 determines that the next received data token requests no data from RAM 104 of smart commerce card 100, then the process next moves to step 228, which illustrates processor 102 of smart commerce card 100 indicating an end of data transmission to the external POS across communication port 110. The process then moves to step 230. Step 230 depicts processor 102 of smart commerce card 100 determining whether smart commerce card 100 has received a signup confirmation. If processor 102 of smart commerce card 100 determines that smart commerce card 100 has received a signup confirmation, then the process proceeds to step 238, which illustrates processor 102 of smart commerce card 100 using display unit 112 to provide a success message to a user. The process then returns to step 200. However, at step 230, if processor 102 of smart commerce card 100 determines that smart commerce card 100 has not received a signup confirmation, then the process next moves to step 236. Step 236 illustrates processor 102 of smart commerce card 100 using display unit 112 to provide a failure message to a user. The process then returns to step 200.

Returning to step 226, if processor 102 of smart commerce card 100 determines that the next received data token requests data from RAM 104 of smart commerce card 100, then the process next moves to step 232, which illustrates processor 102 of smart commerce card 100 determining whether the requested data is private data. If processor 102 of smart commerce card 100 determines that the requested data is not private data, then the process proceeds to step 234. Step 234 depicts processor 102 of smart commerce card 100 encrypting the requested data from private area 106 of RAM 104 and placing the requested data in public area 108 of RAM 104 for transmission of the encrypted data to the external POS across communications port 110. Returning to step 232, if processor 102 of smart commerce card 100 determines that the requested data is private data, then the process proceeds to step 240, which illustrates processor 102 of smart commerce card 100 using display unit 112 to prompt the user for permission to release the private data. The process next moves to step 242.

Step 242 depicts processor 102 of smart commerce card 100 determining whether the user has approved release of the requested private data by pressing 'yes' button 118. If processor 102 of smart commerce card 100 determines that the user has approved release of the requested private data by pressing 'yes' button 118, then the process returns to step 234, which is described above. Returning to step 242, if processor 102 of smart commerce card 100 determines that the user has not approved release of the requested private data, either on the basis of the fact that the user has pressed 'no' button 120 by determining that the user has not pressed either of 'yes' button 118 and 'no' button 120, then the process returns to step 224, which is described above.

Smart commerce card 100 contains a display unit 112, some amount of storage in RAM 104, a biometric reader 116, 'yes' button 118 and 'no' button 120. RAM 104 contains public area 108, where data is unencrypted, and private area 106, where all data is encrypted using the user's private key. Biometric reader 116 provides data to inform processor 102 whether to unlock the card the card and enable a communication channel across communication port 110. Until the proper biometric data is read by biometric reader 116, processor 102 will not allow performance of a transaction. Smart commerce card 100 is initialized with biometric information, generic and personal information about the cardholder, and both the holder's public and private keys, all of which are stored in private area 106.

'Yes' button 118 and 'no' button 120 improve the security model of the smart commerce card 100. The release of information from private area 106 of RAM 104 on smart commerce card 100 is controlled by an authorized user, and only an authorized user. 'Yes' button 118 and 'no' button 120 keys give the authorized user the means to decide whether to release private information from private area 106, and thereby keep the information in private area 106 under the control of only the authorized user. While it would seem more intuitively practical to place 'Yes' button 118 and 'no' button 120 button on the store's POS machine, the store's POS machine could be compromised. A compromised POS machine might indicate a positive response from the holder when, in fact, the user entered a negative response. Therefore, despite the additional overhead of 'yes' button 118 and 'no' button 120 on smart commerce card 100, 'yes' button 118 and 'no' button 120 provide a level of enhanced security in the case of a compromised store POS machine.

When smart commerce card 100 is initialized, smart commerce card 100 is ready for use. A typical scenario for use of smart commerce card 100 involves the holder making a purchase at a store, and signing up for the store's frequent shopper program for the first time. The holder unlocks smart commerce card 100 using the biometric reader 116, which activates allows processor 102 to activate smart commerce card 100. The store's POS machine reads the public key of the smart commerce card 100 from public area 108 across communications port 110, and creates a transaction, asking smart commerce card 100 for the holder's information. The store's POS machine would also provide the store's public key to smart commerce card 100 across communications port 110. Assuming that for this scenario, only the holder's generic information is requested from smart commerce card 100 by the POS, smart commerce card 100 receives the request, and processor 102 decrypts the request using the holder's private key.

As stated, the request was for a set of generic fields. Therefore, smart commerce card 100 encrypts the generic information using the store's public key and copies it into public area 108 of RAM 104 for transmission across communication port 110 of smart commerce card 100. The external POS machine reads the generic information from public area 108 of RAM 104 for transmission across communication port 110 of smart commerce card 100, decrypts the data using the store's private key, and, satisfied with the data, enrolls the shopper for a frequent buyer program.

In a second scenario, assume that the holder is again enrolling in a frequent buyer program. In this scenario, however, the external POS requests the shopper's social security number, which is private information. The holder unlocks smart commerce card 100 using the biometric reader 116, which activates allows processor 102 to activate smart commerce card 100. The store's POS machine reads the public key of the smart commerce card 100 from public area 108 across communications port 110, and creates a transaction, asking smart commerce card 100 for the holder's information. The store's POS machine would also provide the store's public key to smart commerce card 100 across communications port 110. This transaction is decrypted by processor 102 on smart commerce card 100 using the holder's private key, and processor 102 on smart commerce card 100 detects that private information is being requested.

On display unit 112 of smart commerce card 100, a prompt is provided, such as "Provide SSN?" The user is being prompted to respond Yes or No, by pressing 'yes' button 118 or 'no' button 120 on smart commerce card 100. If the holder responds by pressing 'yes' button 118, the information is copied to public area 108 for transmission across communications port 110 after being encrypted by processor 102 using the store's public key, and again, shared with the store's POS machine. If the holder responds by pressing 'no' button 120 or does not respond, the store's POS machine must decide whether to enroll the holder in the frequent buyer program without SSN, or void the transaction. Regardless of choices and outcome, the holder is in a position to grant or deny access to the more private information using smart commerce card 100.

In another scenario, the holder enters a store, at which he is already enrolled in the frequent buyer program at the store, and makes a purchase. The holder presents smart commerce card 100 to the store's POS machine after unlocking smart commerce card 100 using biometric reader 116 and receives an encrypted transaction requesting generic information. The generic information is granted to the store's POS machine, which identifies the holder as someone already enrolled in the store's frequent buyer program. The store records the purchase information, and the buyer accrues any store benefits.

In another scenario, smart commerce card 100 is lost. Without appropriate data for biometric reader 116, smart commerce card 100 cannot be used, and the generic and private information is safe. It is important to note that information in public area 108 is always encrypted, using either the store's or the holder's public key. No unencrypted data is ever exposed in public area 108.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for performing private information exchange in smart card commerce, said method comprising:
    in response to determining that biometric data received on a biometric reader corresponds to an authorized user, unlocking a communication channel on a communication port of a smart card and exchanging public keys;
    in response to determining that a valid information request from an external point of sale machine has been received across said communication channel, the smart card decrypting said information request;
    in response to determining that private data in the smart card has been requested in said information request, the smart card prompting for authorization to release said private data; and
    performing private information exchange in smart card commerce by, in response to receiving authorization for release of the private data via at least one user input device on said smart card, the smart card permitting communication of an encrypted copy of said private data via said communication channel to said external point of sale machine.

2. The method of claim 1, further comprising receiving said biometric data on said biometric reader of said smart card.

3. The method of claim 1, said exchanging comprising placing a public key correlating to said authorized user in a public memory area of said smart card.

4. The method of claim 1, said exchanging comprising receiving a public key from said external point of sale machine.

5. The method of claim 1, further comprising encrypting said private data to generate said encrypted copy of said private data.

6. The method of claim 1, further comprising refusing to perform private information exchange in said smart card commerce by, in response to denial of authorization via the at least one user input device on said smart card, closing said communication channel to said external point of sale machine and displaying a failure message on a display of the smart card.

7. The method of claim 1, wherein:
    the smart card includes a display;
    the at least one user input device is separate from the display; and
    the method further comprises receiving the authorization via the at least one user input device separate from the display.

8. A smart card, comprising:
a communication port;
a memory including private data;
at least one user input device; and
a processor that:
- in response to determining that biometric data received on the biometric reader corresponds to an authorized user, unlocks a communication channel on the communication port and exchanges public keys;
- in response to determining that a valid information request from an external point of sale machine has been received across said communication channel, decrypts said information request;
- in response to determining that the information request requests the private data, prompts for authorization to release said private data; and
- in response to receiving authorization for release of the private data via the at least one user input device on said smart card, permits communication of an encrypted copy of said private data via said communication channel to said external point of sale machine.

9. The smart card of claim 8, further comprising a biometric reader for receiving biometric data on said smart card.

10. The smart card of claim 8, wherein the processor exchanges public keys by placing a public key correlating to said authorized user in a public area of said memory.

11. The smart card of claim 8, wherein the processor encrypts said private data to generate said encrypted copy of said private data.

12. The smart card of claim 8, and further comprising:
a display;
wherein the processor, in response to denial of authorization via the at least one user input device on said smart card, closes said communication channel to said external point of sale machine and presents a failure message on said display.

13. The smart card of claim 8, wherein the smart card includes a display separate from the at least one user input device.

14. A machine-readable storage medium having a plurality of instructions processable by a machine stored therein, wherein said plurality of instructions, when processed by said machine, causes said machine to perform:
- in response to determining that biometric data received on a biometric reader corresponds to an authorized user, unlocking a communication channel on a communication port of the smart card and exchanging public keys;
- in response to determining that a valid information request from an external point of sale machine has been received across said communication channel, decrypting said information request;
- in response to determining that private data in the smart card has been requested in said information request, prompting for authorization to release said private data; and
- performing private information exchange in smart card commerce by, in response to receiving authorization for release of the private data via at least one user input device on said smart card, permitting communication of an encrypted copy of said private data via said communication channel to said external point of sale machine.

15. The machine-readable storage medium of claim 14, wherein the receiving includes receiving said item of biometric data on said biometric reader of said smart card.

16. The machine-readable storage medium of claim 14, wherein the exchanging includes placing a public key correlating to said authorized user in a public memory area of said smart card.

17. The machine-readable storage medium of claim 14, wherein the exchanging includes receiving a public key from said external point of sale machine.

18. The machine-readable storage medium of claim 14, wherein the plurality of instructions further cause the machine to perform encrypting said private data to generate said encrypted copy of said private data.

19. The machine-readable storage medium of claim 14, wherein:
the smart card includes a display;
the at least one user input device is separate from the display; and
the plurality of instructions further cause the machine to receive the authorization via the at least one user input device separate from the display.

* * * * *